US010450856B2

(12) United States Patent
Khalaj Amineh et al.

(10) Patent No.: US 10,450,856 B2
(45) Date of Patent: Oct. 22, 2019

(54) DETECTING DEFECTS IN NON-NESTED TUBINGS AND CASINGS USING CALIBRATED DATA AND TIME THRESHOLDS

(71) Applicant: HALLIBURTON ENERGY SERVICES, INC., Houston, TX (US)

(72) Inventors: Reza Khalaj Amineh, Houston, TX (US); Luis Emilio San Martin, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 228 days.

(21) Appl. No.: 15/315,335

(22) PCT Filed: Jul. 13, 2015

(86) PCT No.: PCT/US2015/040192
§ 371 (c)(1),
(2) Date: Nov. 30, 2016

(87) PCT Pub. No.: WO2016/010915
PCT Pub. Date: Jan. 21, 2016

(65) Prior Publication Data
US 2017/0101865 A1 Apr. 13, 2017

Related U.S. Application Data

(60) Provisional application No. 62/023,862, filed on Jul. 12, 2014.

(51) Int. Cl.
*G01V 3/00* (2006.01)
*E21B 47/09* (2012.01)
(Continued)

(52) U.S. Cl.
CPC .......... *E21B 47/0905* (2013.01); *E21B 47/00* (2013.01); *E21B 47/0002* (2013.01);
(Continued)

(58) Field of Classification Search
CPC .. E21B 47/0002; E21B 47/0006; E21B 47/08; E21B 47/09; E21B 47/0905;
(Continued)

(56) References Cited

U.S. PATENT DOCUMENTS 4,878,180 A 10/1989 McWhirter et al.
2006/0202685 A1 9/2006 Barolak et al.
(Continued)

FOREIGN PATENT DOCUMENTS

EP 0816838 1/1998
WO 1998030895 A1 7/1998
WO 2016/010915 1/2016

OTHER PUBLICATIONS

European Application Serial No. 15 821 352.0, Extended European Search Report; dated Mar. 12, 2018, 12 Pages.
(Continued)

*Primary Examiner* — Vinh P Nguyen
(74) *Attorney, Agent, or Firm* — Gilliam IP PLLC

(57) ABSTRACT

A method of detecting defects in non-nested tubings or a casing includes acquiring a first set of data from an electromagnetic ("EM") tool run inside a first of the non-nested tubings. The method further includes calibrating the data to reduce effects from a second of the non-nested tubings, identifying a location of a defect in the first of the non-nested tubings or the casing, and adjusting the data to compensate for eccentricity if the defect is in the casing. The method further includes performing an inversion algorithm on the data, the inversion algorithm developed for a single tubing configuration.

14 Claims, 6 Drawing Sheets

(51) Int. Cl.
    *E21B 47/00* (2012.01)
    *E21B 47/08* (2012.01)
    *G01V 3/26* (2006.01)

(52) U.S. Cl.
    CPC .......... *E21B 47/0006* (2013.01); *E21B 47/08* (2013.01); *E21B 47/09* (2013.01); *G01V 3/26* (2013.01)

(58) Field of Classification Search
    CPC ........... E21B 47/02216; E21B 43/2401; E21B 47/122; E21B 47/082; E21B 47/10; E21B 47/102; E21B 47/0005; E21B 47/01; E21B 47/011; E21B 47/024; E21B 47/12; E21B 47/18; G01V 3/26; G01V 3/38; G01V 3/30; G01V 11/005; G01V 3/12; G01V 11/00; G01V 3/00; G01V 3/34; G01V 5/045; G06F 19/00
    See application file for complete search history.

(56) References Cited

U.S. PATENT DOCUMENTS

| | | |
|---|---|---|
| 2009/0166035 A1 | 7/2009 | Almaguer |
| 2009/0195244 A1 | 8/2009 | Mouget et al. |
| 2013/0193953 A1 | 8/2013 | Yarbro et al. |
| 2015/0378046 A1* | 12/2015 | Donderici .......... E21B 47/0002 324/339 |
| 2017/0191361 A1* | 7/2017 | Khalaj Amineh ....... G01V 3/28 |

OTHER PUBLICATIONS

Arbuzov, A. A. et al., "Memory Magnetic Imaging Defectoscopy," SPE 162054; Society of Petroleum Engineers, Russian Oil & Gas Exploration & Production Technical Conference and Exhibition held in Moscow, Russia, Oct. 16-18, 2012, 10 pgs.

Garcia, Javier et al., "Successful Application of a New Electromagnetic Corrosion Tool for Well Integrity Evaluation in Old Wells Completed with Reduced Diameter Tubular," IPTC 16997, Prepared for presentation at the International Petroleum Technology Conference held in Beijing, China, Mar. 26-28, 2013, 12 pgs.

PCT International Search Report and Written Opinion, dated Oct. 15, 2015, Appl No. PCT/US2015/040192, "Detecting Defects in Non-Nested Pipes Using Calibrated Data and Time Thresholds," Filed Jul. 13, 2015, 9 pgs.

European Application Serial No. 15 821 352.0; Invitation Pursuant to Article 94(3) and 71(1); dated Nov. 21, 2018, 8 pages.

Indonesian Application Serial No. P-00201608974; Office Action; dated Mar. 8, 2019, 3 pages.

* cited by examiner

DETECTING DEFECTS IN NON-NESTED TUBINGS AND CASINGS USING CALIBRATED DATA AND TIME THRESHOLDS

CROSS-REFERENCE TO RELATED APPLICATIONS

This application claims priority to U.S. Provisional Application Ser. No. 62/023,862 titled "Dual Completion Inspection with EM Corrosion Tool" filed on Jul. 12, 2014 and incorporated herein by reference.

BACKGROUND

Scaling, corrosion, precipitates, and material defects are some problems faced by the oil and gas industry when managing production well and pipeline assets. These problems lead to diminished production in wells, casing integrity failure, and pipeline integrity failure any of which may result in costly and complex remediation measures. As such, electromagnetic techniques are commonly used to monitor the condition of the production and intermediate casing strings, tubings, collars, filters, packers, and perforations. These techniques can measure permeability data to obtain accurate measurements of tubing thickness and tubing corrosion.

This form of corrosion monitoring can be especially useful to prevent pipe integrity failures in mature wells or non-producing wells. For example, corrosion damage typically decreases the thickness of casing strings. One electromagnetic technique used for defect detection is the eddy current technique. In this technique, when a transmitter coil emits a primary electromagnetic field, or signal, eddy currents are produced in, e.g., the casing. These eddy currents then produce secondary fields, or signals, which are received by a receiver coil. When recorded and processed, this data can be employed to perform an evaluation of the casing.

However, most electromagnetic techniques and algorithms were developed for single tubing and concentric pipe configurations. Here pipe is used to denote a tubing or casing. Specifically, a configuration including a single production tubing surrounded by concentric casing is the configuration for which most techniques and algorithms such as inversion were developed. In such scenarios, it is not difficult to determine whether the location of a defect is on the production tubing or surrounding casing. However, a configuration of one or more non-concentric, or non-nested, tubings within a casing causes difficulty in pinpointing the location of defects.

BRIEF DESCRIPTION OF THE DRAWINGS

Accordingly, systems and methods for detecting defects in non-concentric, or non-nested, pipes using calibrated data and time thresholds are disclosed herein. In the following detailed description of the various disclosed embodiments, reference will be made to the accompanying drawings in which.

Figure 1:
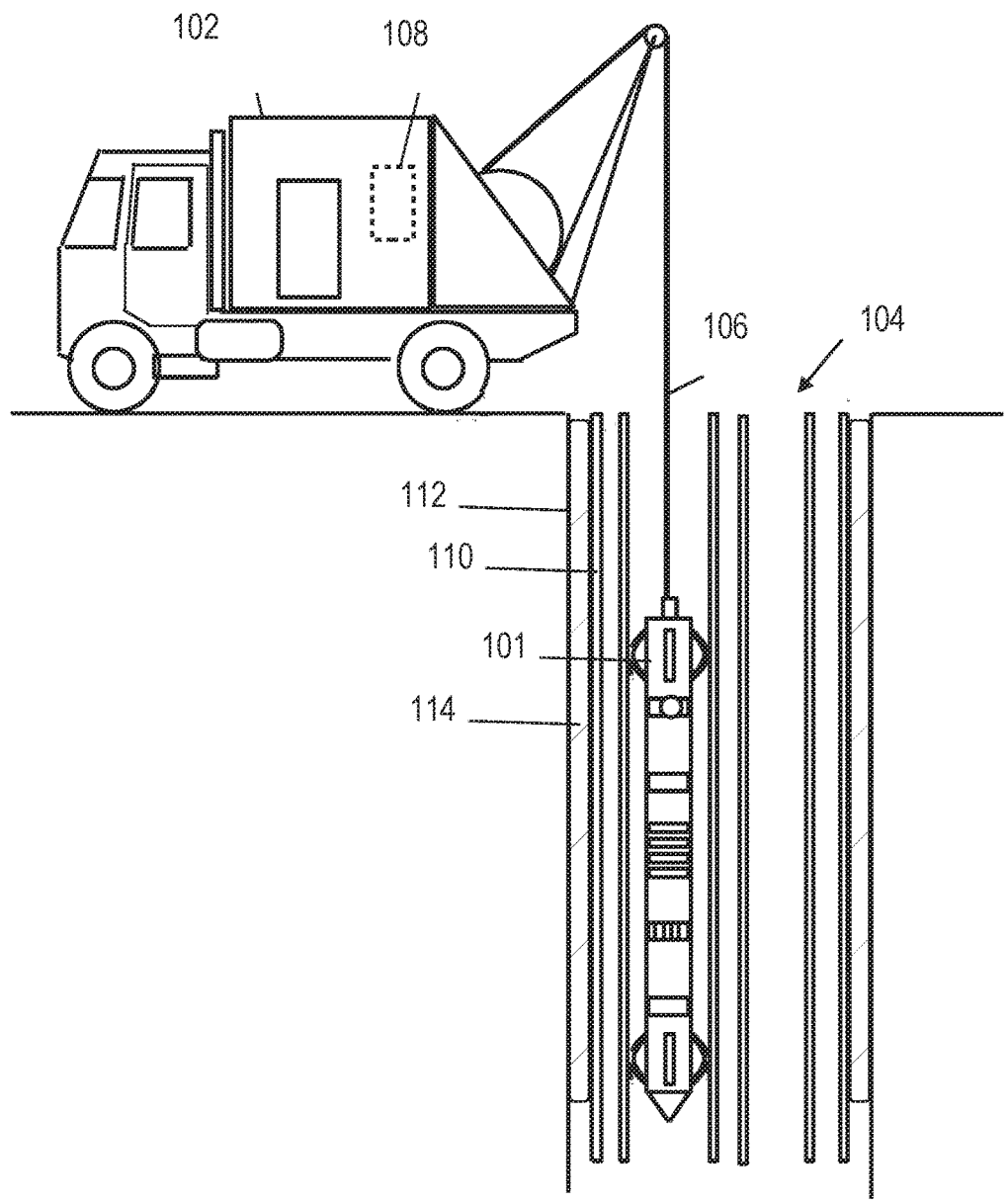
FIG. 1 is a contextual view of an illustrative wireline environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

Also, "non-concentric" or "non-nested" refers to pipe that runs generally parallel to at least one other tubing or casing without any one of them containing any of the others.

DETAILED DESCRIPTION

The issues identified in the background are at least partly addressed by systems and methods for detecting defects in non-concentric, or non-nested, tubings and casings using calibrated data and time thresholds. An electromagnetic ("EM") tool may be used for integrity evaluation of the tubings and casing in a dual completion configuration. For example, a first non-nested tubing within the casing may terminate at a first depth while a second non-nested tubing within the casing may terminate at a second depth, and each non-nested tubing may transport hydrocarbons to the surface. At the portions within the borehole where both tubings run alongside each other, any defects detected by the EM tool are difficult to pinpoint as being located on the first non-nested tubing, the second non-nested tubing, or the casing using traditional methods. However, using the systems and methods described below, such defects may be accurately located.

To illustrate a context for the disclosed systems and methods, FIG. 1 shows a contextual view of an illustrative wireline embodiment. However, the disclosure is not limited to the context of FIG. 1. For example, the tool 101 may be employed in a slickline or coiled tubing embodiment using conductors and fiber optic cables for power and data transmissions. As another example, the tool 101 may be employed in an off-shore environment with appropriate supporting equipment as well. For example, the logging truck 102 may be replaced by off-shore equipment.

In a workover operation, an existing well may need repair or stimulation for the purpose of restoring, prolonging, or enhancing the production of hydrocarbons. As such, the tubings and casings within the well may need inspection for defects to diagnose the cause of the low production. Accordingly, a logging truck 102 may suspend a wireline logging tool 101 on a wireline cable 106 including conductors for transporting power to the tool 101 and telemetry from the tool 101 to the surface. The tool 101 may be an EM tool that uses eddy current techniques to perform pipe inspection. The tool 101 may be suspended in one of multiple non-nested tubings 104 within a casing 110 that is bonded to a wall of a borehole 112 by a cement sheath 114. The tool 101 may include depth sensors, temperature sensors, pressure sensors, and the like that collect downhole measurements for tubing inspection and evaluation. On the surface, a computer 108 may obtain and store measurement data from the tool 101 as a function of position along the borehole. In at least one embodiment, the tool 101 itself may include a processor coupled with memory to obtain, store, and process measurement data taken by the sensors. Such processing may occur downhole.

Software may run on the computer 108 to collect the data and organize it in a file or database. Specifically, a processor coupled to memory may execute the software. The software may respond to user input via a keyboard or other input mechanism to display data as an image or movie on a monitor or other output mechanism such as a printer. The software may process the data to optimize detection of defects as described below. In this way, a multi-dimensional representation of the surrounding tubings 104 and casing 110 may be obtained, processed, and displayed. Furthermore, the software may issue an audio or visual alert to direct a user's attention to a particular defect location.

With respect to FIG. 1, the use of the tool 101 is described using one orientation and one borehole position for clarity. However, the tool 101 may operate at multiple borehole positions as the tool 101 is conveyed along the borehole. A discussion of defect location within such a configuration will be helpful.

Figure 2:
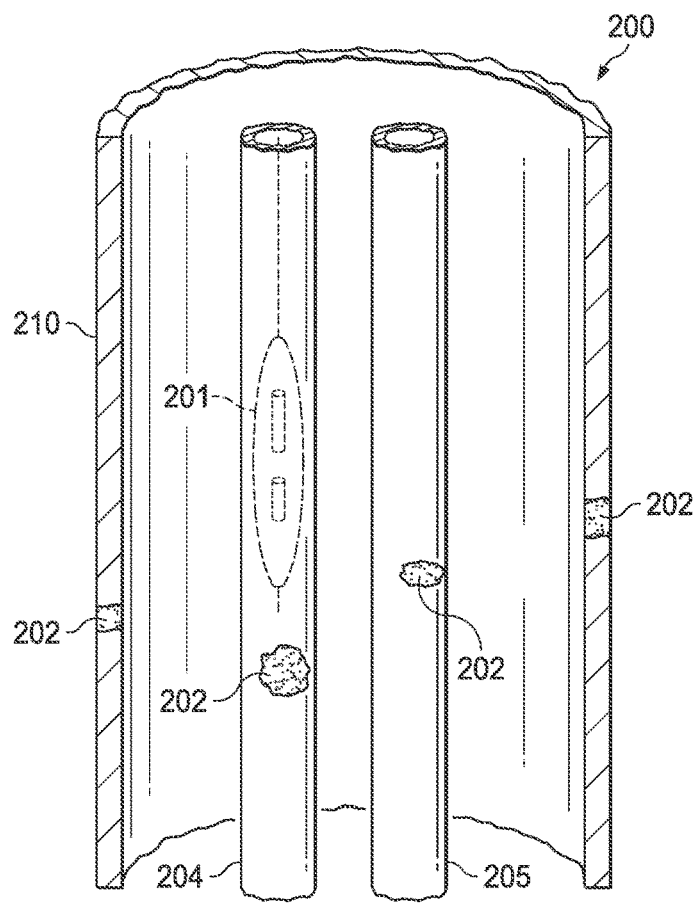
FIG. 2 is diagram of an illustrative configuration of non-nested tubings and a casing.

FIG. 2 is diagram of an illustrative configuration of non-nested tubings 204, 205 and a casing 210 including defects 202. A system 200 for detecting defects 202 in the tubings 204, 205 and casing 210 includes an EM tool 201 that is conveyed along the first non-nested tubing 204. The tool 201 acquires a first set of data using the techniques described above. In at least one embodiment, the system 200 includes a storage device that stores the data. For example, the tool 201 may include a processor coupled to memory, or a computer at the surface (computer 108 in FIG. 1) may include a processor coupled to memory.

The first set of data includes decay responses from the multiple tubings 204, 205 and casing 210 at various depths. However, occasionally the distance between the casing 210 and the tool 201 may be equal or similar to the distance between the tool 201 and the other tubing 205. In such a scenario, a defect 202 on the other tubing 205 may not be distinguished from a defect on the casing 210. Accordingly, the tool 201 is conveyed along the second non-nested tubing 205, thus acquiring a second set of data. Similar to the first set of data, the second set of data includes decay responses from the multiple tubings 204, 205 and casing 210 at various depths. The location of the defect 202 may be determined based on comparison between the first and second set of data. To explain, a visualization of a decay response will be helpful.

Figure 3:
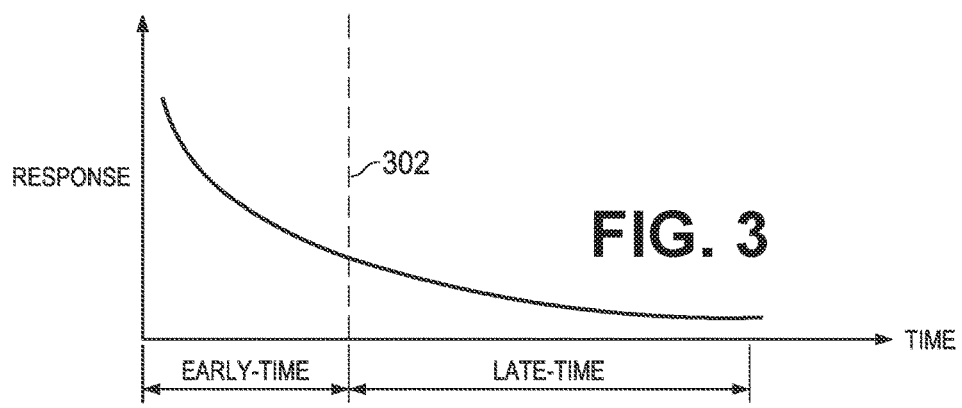
FIG. 3 is a graph of an illustrative decay response.

FIG. 3 is a graph of an illustrative decay response. Decay responses make up a portion of the first and second set of data collected from the different non-nested tubings and casing illustrated in FIG. 2. The decay response may be partitioned or divided into two sections or portions by a time threshold 302. The two sections are referred to as an early-time response, for the portion of the response before the time threshold 302, and a late-time response for the portion of the response after the time threshold 302. Defects from nearby tubings will cause a change in amplitude in the early-time response, while defects from further tubings or a casing will cause a change in amplitude in the late-time response. However, distance is not the only factor that gives rise to such behavior. Specifically, EM waves needing to pass more tubings and other downhole elements to reach the tool suffer from more attenuation and delay. As such, those waves tend to cause changes in amplitude in the late-time response rather than the early-time response regardless of their proximity to the tool. Accordingly, the location of the time threshold 302 that divides the early-time response from the late-time response may be selected based on the characteristics of the tubings and casing and other downhole elements such as size, thickness, outer diameter, inner diameter, radius, composition, magnetic permeability and the like. In at least one embodiment, selection of the appropriate time threshold is based on historical data.

In at least one embodiment, a duration of the decay response is between 50 to 2000 milliseconds. In a time-domain system, a digital sampling system is used to obtain samples with a sampling frequency on the order of 10-10000 Hertz. Furthermore, the time threshold is located between 20 milliseconds and 100 milliseconds in such an embodiment.

Returning to FIG. 2, as the tool 201 is conveyed along one of the tubings, for example inside tubing 204, the defects in the same tubing 204 provide signatures (a distinctive change or deviation in the amplitude of the decay response) in the early time period, i.e. before the time threshold, while the defects on the other tubing 205 and casing 210 provide signatures in the late time period, i.e. after the time threshold. The behavior is similar when the tool 201 is conveyed along the other tubing 205. That is, the defects in the other tubing 205 provide signatures in the early time period while the defects on the first tubing 204 and casing 210 provide signatures in the late time period.

In this way, a comparison of the first and second set of data isolates the location of a potential defect by the process of elimination. For example, the first run or conveyance of the EM tool 201 may be in the tubing 204 while the second run may be in tubing 205. An early-time signature in the first run and a late-time signature in the second run at a particular depth indicates a defect in the tubing 204. An early-time signature in the second run and a late-time signature in the first run at a particular depth indicates a defect in the tubing 205. Also, a late-time signature in the first run and a late-time signature in the second run at a particular depth indicates a defect in the casing 210.

Thus, the defects 202 on the tubings 204, 205 and casing 210 may be differentiated by performing two conveyances of the EM tool 201, one in each tubing 204, 205 and comparing the first and second set of data obtained from the two conveyances at similar depths. Calibration of the first and second set of data will be helpful for the comparison.

Figure 4:
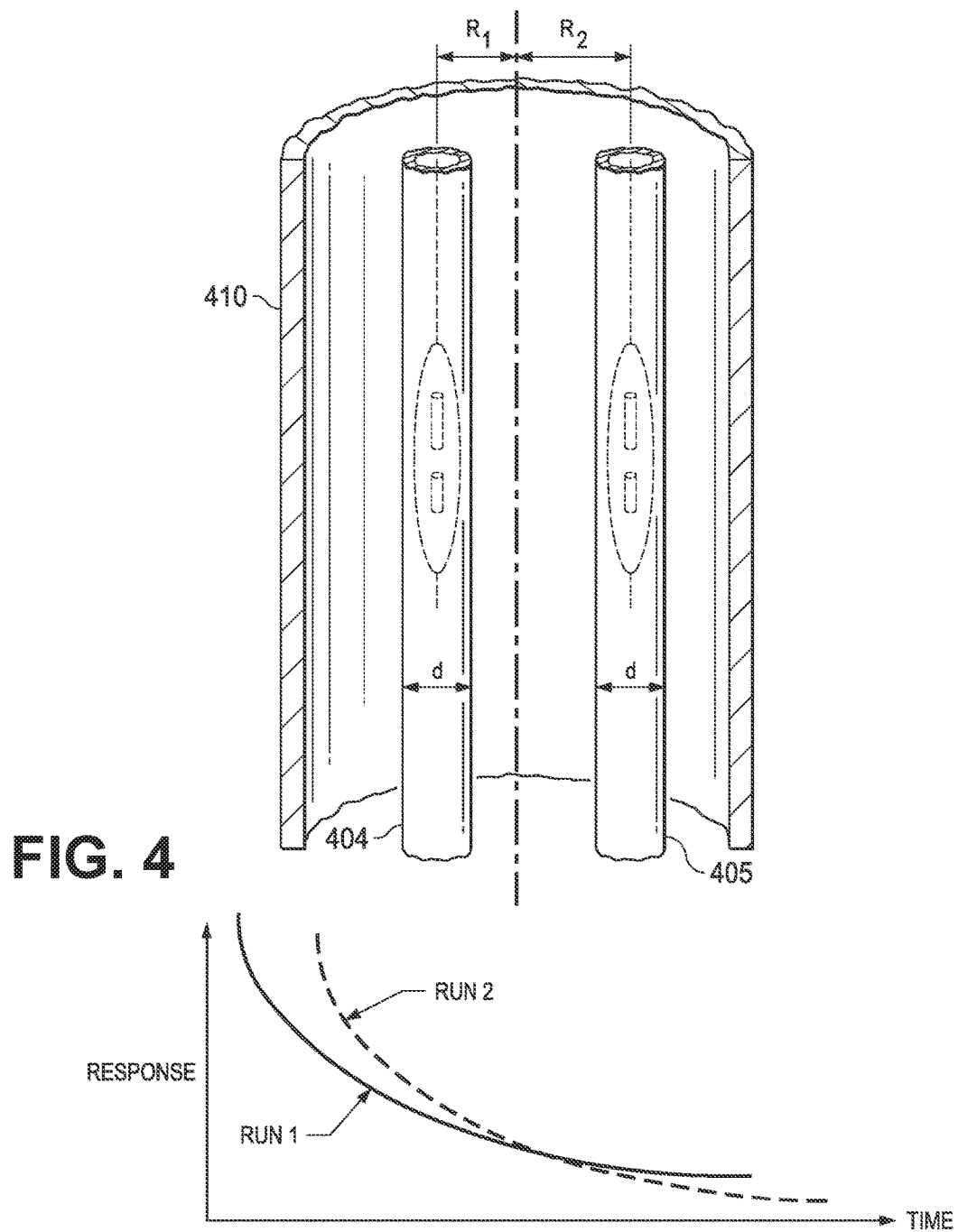
FIG. 4 is a diagram of an illustrative configuration of non-symmetric non-nested tubings and casing and a graph of illustrative decay responses.
Figure 5:
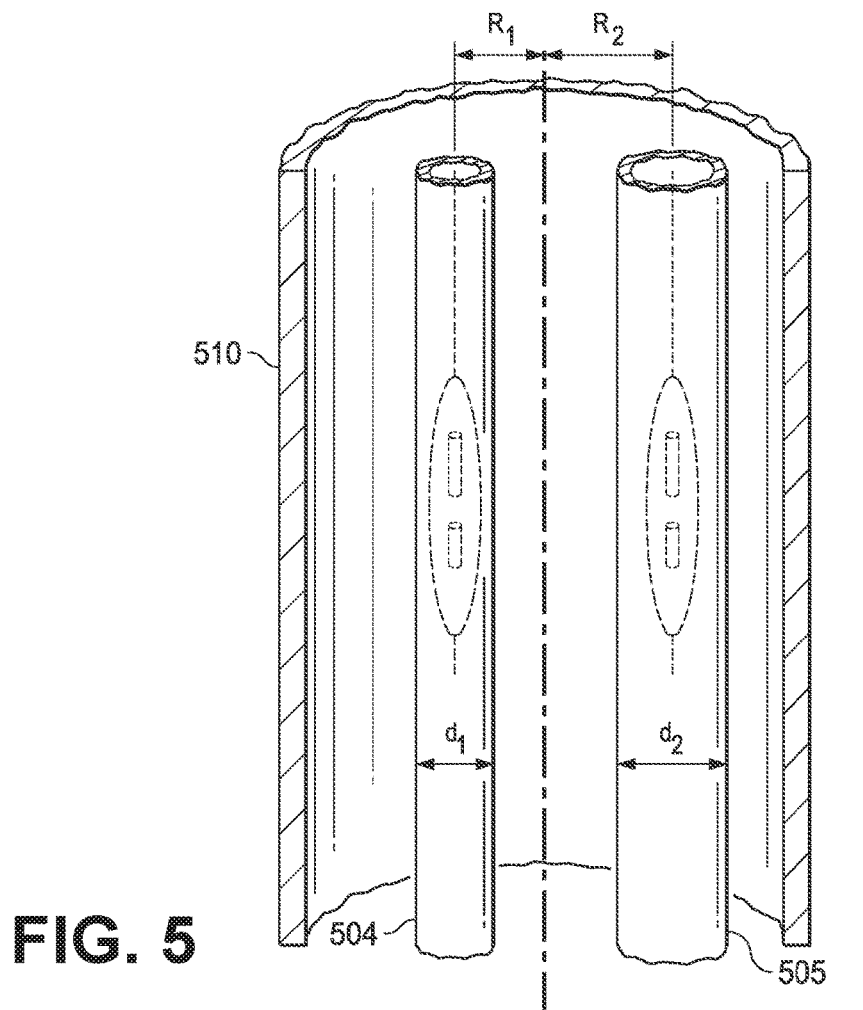
FIG. 5 is a diagram of an illustrative configuration of non-symmetric non-nested tubings with different diameters and a casing and a graph of illustrative decay responses.
Figure 5:
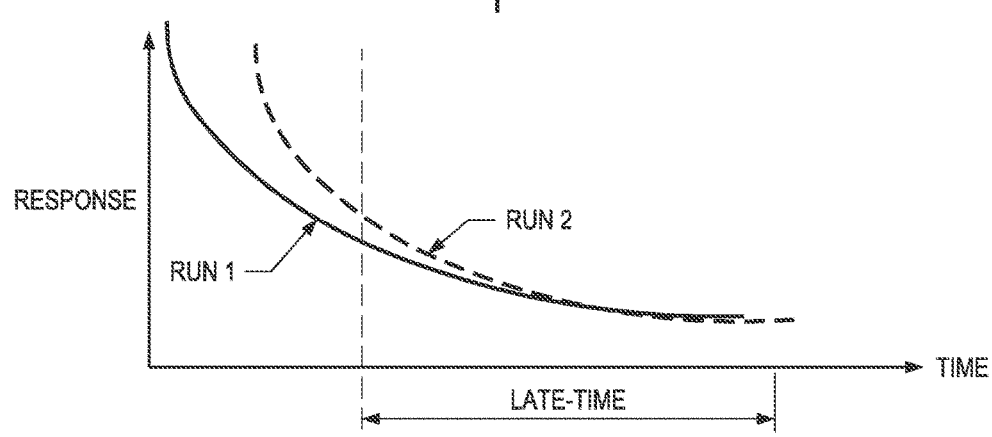

The system 200 may include a computing device, e.g. on the tool 101 or at the surface (e.g., computer 108 of FIG. 1), that calibrates the data by aligning the second set of data with the first set of data using collar responses as alignment markers. Specifically, the collars provide easily identifiable peaks within the first and second set of data such that when the peaks corresponding to the same collar are aligned, the entire first and second set of data is aligned according to depth. Visually, the first and second set of data may be shown as logs of EM responses according to depth. Additionally, the first and second set of data may be calibrated to match the responses corresponding to sections of the tubings 204, 205 and casing 210 without defects, which produce similar responses. As such, the variations in the signal due to different tubing locations within the casing is reduced. FIGS. 4 and 5 illustrate the matching of decay responses within the first and second set of data.

FIG. 4 is a diagram of an illustrative configuration of non-symmetric non-nested tubings 404, 405 and a casing 410 and also a graph of illustrative decay responses. Specifically, the tubings 404, 405 are non-symmetric because the distances $R_1$, $R_2$ between the centers of the tubings 404, 405 to the center of the casing 410 are not equal. However, the diameters $d_1$, $d_2$ of the tubings 404, 405 are equal. Accordingly, both early and late-time decay responses from the first and second run may be matched as illustrated by the similar decay response curves in the graph of FIG. 4. This matching may be performed by proper shifting of the responses versus time and optionally applying proper coefficients. Such matching reduces the variation in the response due to different locations, standoff, and eccentricity of the tubings within the casing.

FIG. 5 is a diagram of an illustrative configuration of non-symmetric non-nested tubings 504, 505 with different diameters and a casing 510 and also a graph of illustrative decay responses. Specifically, the tubings 504, 505 are not symmetric ($R_1$ does not equal $R_2$) and have different diameters $d_1$, $d_2$. As such, only the late-time decay responses may be matched because of the shape of the decay response curves as illustrated in the graph of FIG. 5. This matching may be performed by proper shifting of the responses versus time and optionally applying proper coefficients. Such matching reduces the variation in the response due to different locations, standoff, and eccentricity of the tubings within the casing.

Figure 6:
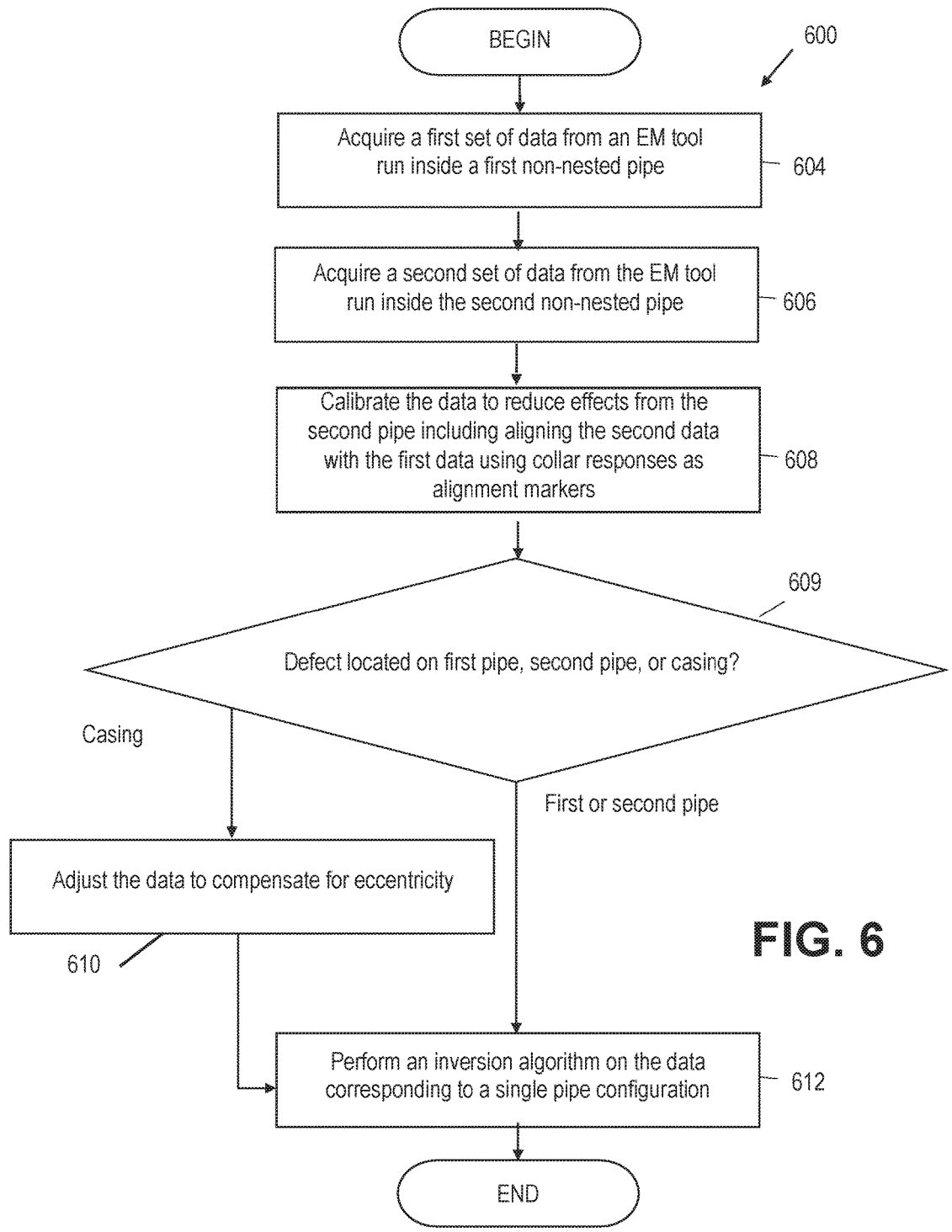
FIG. 6 is a flow diagram of an illustrative method of detecting defects in non-nested tubings and a casing.

FIG. 6 illustrates a first method 600 of detecting defects in a non-nested tubing configuration. At 604, a first set of data is acquired from an EM tool conveyed along a first of the non-nested tubings. The tool may use eddy current techniques to perform pipe inspection, and the tool may include depth sensors, temperature sensors, pressure sensors, and the like that collect other downhole measurements for tubing inspection and evaluation. The first set of data includes a first decay response.

At 606, a second set of data is acquired from the EM tool conveyed along a second of the non-nested tubings. The second set of data includes a second decay response.

At 608, the data is calibrated to reduce effects from the second of the non-nested tubings. Calibrating the data may include aligning the second set of data with the first set of data using collar responses as alignment markers. Specifically, the collars provide easily identifiable peaks within the first and second set of data such that when the peaks corresponding to the same collar are depth aligned, the first and second set of data are depth aligned.

At 609, a defect is determined to be located on the first non-nested tubing, the second non-nested tubing, or the casing. Specifically, a time threshold, before which the decay response is substantially indicative of a potential defect in the first of the non-nested tubings, and after which the decay response is substantially indicative of a potential defect in a second of the non-nested tubings or the casing is determined. The time threshold may be determined based on outer diameters, thicknesses, and magnetic permeabilities of the non-nested tubings and the casing. The time threshold may also be determined based on historical data. Finally, the time threshold may be determined based on simulating the non-nested tubings and casing without defects.

Next, a location of an actual defect among the potential defects is identified using the time threshold. For example, identifying the location may include identifying whether the actual defect is located on the first of the non-nested tubings, the second of the non-nested tubings, or the casing. Specifically, the first decay response may be compared with the second decay response. A larger change in amplitude of the first decay response before the time threshold compared to a smaller change in amplitude of the second decay response after the time threshold may indicate an actual defect on the first non-nested tubing. A smaller change in amplitude of the first decay response after the time threshold compared to a larger change in amplitude of the second decay response before the time threshold may indicate an actual defect on the second non-nested tubing. Finally, a larger change in amplitude of the first decay response after the time threshold compared to a smaller change in amplitude of the first decay response before the time threshold as well as a larger change in amplitude of the second decay response after the time threshold compared to a smaller change in amplitude of the second decay response before the time threshold may indicate an actual defect on the casing. As described above, the process of elimination over two runs, one within the first non-nested tubing and one within the second non-nested tubing, aids in the differentiation of defects.

At 610, if the defect is located on the casing, the data is adjusted to compensate for eccentricity. Specifically, the decay responses, such as the first and second decay response, from the first and second set of data are matched. In at least one embodiment, both early and late-time portions of the decay responses from the first and second run are matched. In another embodiment, if the first of the non-nested tubings has different dimensions such as outer diameter, thickness, etc., than the second of the non-nested tubings, then only the late-time responses are matched. Such matching reduces the variation in the response due to different locations, standoff, and eccentricity of the tubings within the casing. Accordingly, the calibrated and adjusted data with respect to the first non-nested tubing is of the form required by inversion algorithms developed for a single tubing scenario.

At 612, an inversion algorithm is performed on the calibrated and/or adjusted data, the inversion algorithm corresponding to, and developed for, a single tubing configuration. An inversion is a mathematical process by which wall thickness, conduction, and other model parameters are iteratively modified to generate a model that is consistent with the data. The inversion may be performed on the combined first and second set of data or separately on the first and second set of data, after which the results of the inversion may be combined. Performing the inversion may include performing the inversion on only the late time responses (after the time threshold) if the defect is located on the casing. Performing the inversion may also include performing the inversion on only the early time responses (before the time threshold) if the defect is located on the first or second non-nested tubing.

The completed inversion model specifies the wall thickness for each tubing and/or casing. If the thickness is below a fixed or variable threshold at a particular location, in various embodiments, that location is identified as having a defect. As described above, the location of the defect may be displayed using appropriate hardware.

Figure 7:
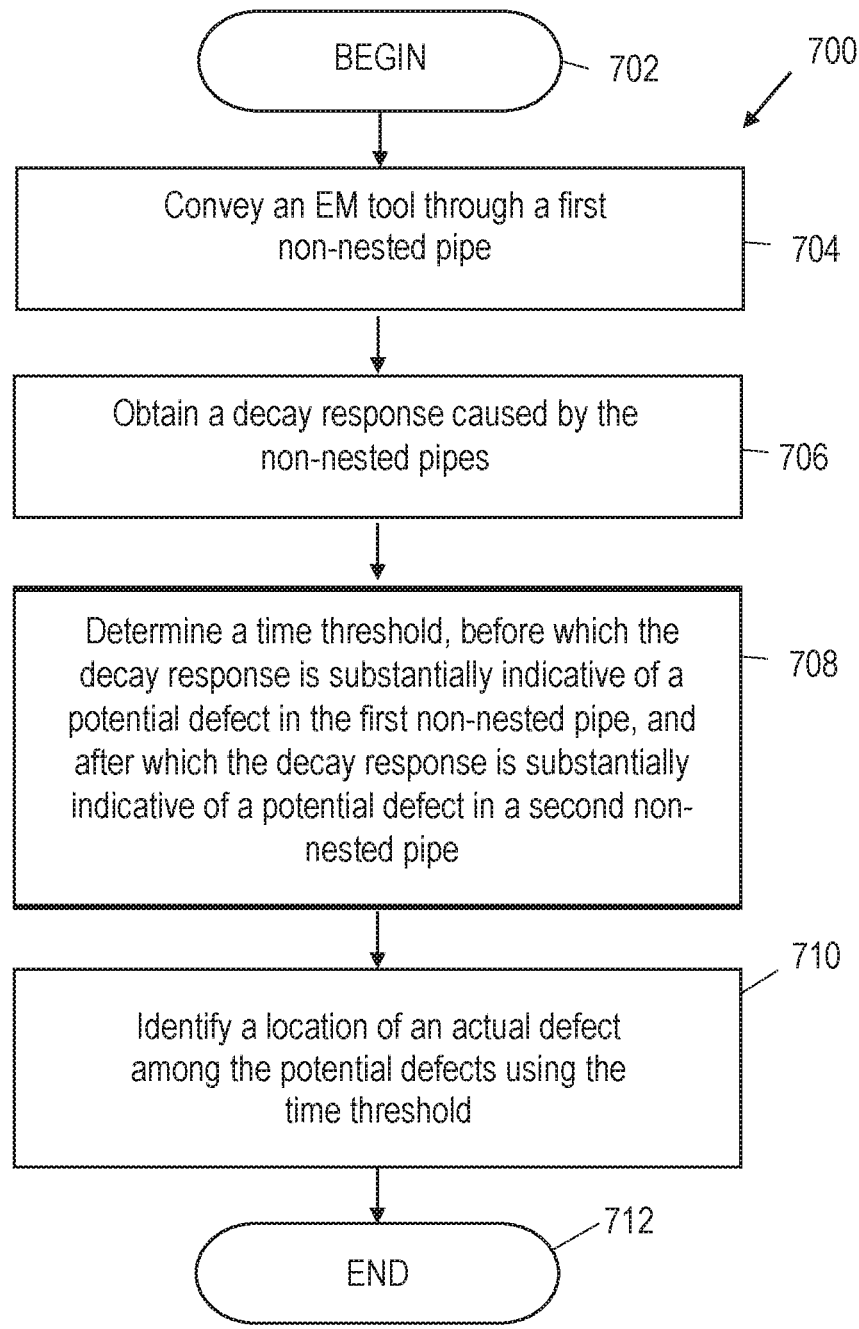
FIG. 7 is a flow diagram of an illustrative method of detecting defects in non-nested tubings and a casing.

FIG. 7 illustrates a method 700 of detecting defects in non-nested tubing using a time threshold beginning at 702 and ending at 712. At 704, an EM tool is conveyed through a first of the non-nested tubings. As mentioned above, the tool may use eddy current techniques to perform pipe inspection, and the tool may include depth sensors, temperature sensors, pressure sensors, and the like that collect downhole measurements for tubing inspection and evaluation.

At 706, a decay response caused by the non-nested tubings and a casing is obtained. The method may further include conveying the EM tool through the second of the non-nested tubings and obtaining a second decay response caused by the non-nested tubings and the casing.

At 708, a time threshold, before which the decay response is substantially indicative of a potential defect in the first of the non-nested tubings, and after which the decay response is substantially indicative of a potential defect in a second of the non-nested tubings or the casing is determined. The time threshold may be determined based on outer diameters, thicknesses, and magnetic permeabilities of the non-nested tubings and the casing. The time threshold may also be determined based on historical data. Finally, the time threshold may be determined based on simulating the non-nested tubings and casing without defects.

At 710, a location of an actual defect among the potential defects is identified using the time threshold. For example, identifying the location may include identifying whether the actual defect is located on the first of the non-nested tubings, the second of the non-nested tubings, or the casing. Specifically, the decay response may be compared with the second decay response. A larger change in amplitude of the decay response before the time threshold compared to a smaller change in amplitude of the second decay response after the time threshold may indicate an actual defect on the first non-nested tubing. A smaller change in amplitude of the decay response after the time threshold compared to a larger change in amplitude of the second decay response before the time threshold may indicate an actual defect on the second non-nested tubing. Finally, a larger change in amplitude of the decay response after the time threshold compared to a smaller change in amplitude of the decay response before the time threshold as well as a larger change in amplitude of the second decay response after the time threshold compared to a smaller change in amplitude of the second decay response before the time threshold may indicate an actual defect on the casing. As described above, the process of elimination over two runs, one within a first non-nested tubing and one within a second non-nested tubing, aids in the differentiation of defects. These defects may be identified at particular depths as well. As described above, the location of the defects may be displayed using appropriate hardware.

The disclosed methods and systems for detecting defects in non-nested tubings and casings have several advantages. First, defects on tubings and a casing can be distinguished separately. The capability of distinguishing the defects on each one of the tubings or casing separately reduces the cost and time for the workover process significantly. Second, the inversion process for single tubing configuration is extended to non-nested tubing. Third, quantitative defect evaluation can be performed for tubings and a casing separately. Fourth, the integrity evaluation of casing is improved due to acquiring more data. All these issues produce significant financial advantages in inspection of cased boreholes.

A method of detecting defects in non-nested tubings or a casing includes acquiring a first set of data from an electromagnetic ("EM") tool run inside a first of the non-nested tubings. The method further includes calibrating the data to reduce effects from a second of the non-nested tubings and adjusting the data to compensate for eccentricity of the first of the non-nested tubings within the casing. The method further includes performing an inversion algorithm on the data, the inversion algorithm corresponding to, and developed for, a single tubing configuration, and identifying a location of a defect in the first of the non-nested tubings or the casing based on the inversion algorithm.

The method may further include acquiring a second set of data from the EM tool run inside the second of the non-nested tubings. Calibrating the data may include aligning the second set of data with the first set of data using collar responses as alignment markers. The first set of data may include a first decay response, the second set of data may include a second decay response, and adjusting the data may include matching the first decay response with second decay response. The first set of data may include a first decay response, the second set of data may include a second decay response, and adjusting the data may include matching a portion of the decay response after a time threshold with a portion of the second decay response after the time threshold if the first of the non-nested tubings has a different outer diameter than the second of the non-nested tubings. Identifying the location of the defect may include comparing the first decay response with the second decay response before and after the time threshold.

A method of detecting defects in non-nested tubings or a casing includes conveying an electromagnetic ("EM") tool through a first of the non-nested tubings and obtaining a decay response caused by the non-nested tubings and a casing. The method further includes determining a time threshold, before which the decay response is substantially indicative of a potential defect in the first of the non-nested tubings, and after which the decay response is substantially indicative of a potential defect in a second of the non-nested tubings or the casing. The method further includes identifying a location of an actual defect among the potential defects using the time threshold.

Identifying the location may include identifying whether the actual defect is located on the first of the non-nested tubings, the second of the non-nested tubings, or the casing. The time threshold may be determined based on outer diameters, thicknesses, and magnetic permeabilities of the non-nested tubings and the casing. The time threshold may be determined based on historical data. The time threshold may be determined based on simulating the non-nested tubings and casing without defects. The method may further include conveying the EM tool through the second of the non-nested tubings and obtaining a second decay response caused by the non-nested tubings and the casing, and identifying the location may further include comparing the decay response with the second decay response. Identifying the location may further include identifying that the actual defect is located on the first of the non-nested tubings based on a larger change in amplitude of the decay response before the time threshold compared to a smaller change in amplitude of the second decay response after the time threshold. Identifying the location may further include identifying that the actual defect is located on the second of the non-nested tubings based on a smaller change in amplitude of the decay response after the time threshold compared to a larger change in amplitude of the second decay response before the time threshold. Identifying the location may further include identifying that the actual defect is located on the casing based on a larger change in amplitude of the decay response after the time threshold compared to a smaller change in amplitude of the decay response before the time threshold as well as a larger change in amplitude of the second decay response after the time threshold compared to a smaller change in amplitude of the second decay response before the time threshold.

A system for detecting defects in non-nested tubings or a casing includes an electromagnetic (EM) tool to acquire a first set of data from a first of the non-nested tubings and a storage device to store the data. The system further includes a computing device to calibrate the data to reduce effects from a second of the non-nested tubings, adjust the data to compensate for eccentricity of the first of the non-nested tubings within the casing, perform an inversion algorithm on the data, the inversion algorithm corresponding to, and developed for, a single tubing configuration, and provide results of the inversion algorithm to an output device.

The computing device may acquire a second set of data from the second of the non-nested tubings. The computing device may calibrate the data by aligning the second set of data with the first set of data using collar responses as alignment markers. The first set of data may include a first decay response, the second set of data may include a second decay response, and the computing device may adjust the data by matching the first decay response with second decay response. The first set of data may include a first decay response, the second set of data may include a second decay response, and the computing device may adjust the data by matching a portion of the first decay response after a time threshold with a portion of the second decay response after the time threshold if the first of the non-nested tubings has a different outer diameter than the second of the non-nested tubings.

While the present disclosure has been described with respect to a limited number of embodiments, those skilled in the art will appreciate numerous modifications and variations therefrom. It is intended that the appended claims cover all such modifications and variations.

What is claimed is:

1. A method of detecting defects in non-nested tubings or a casing comprising:
    acquiring, at a processor, a first set of data from an electromagnetic ("EM") tool run inside a first of the non-nested tubings;
    acquiring, at the processor, a second set of data from the EM tool run inside a second of the non-nested tubings;
    calibrating, by the processor, the first set of data to reduce effects from the second of the non-nested tubings by aligning the second set of data with the first set of data;
    identifying, by the processor, a location of a defect in the first of the non-nested tubings, the second of the non-nested tubings, or the casing;
    adjusting, by the processor, the first set of data to compensate for eccentricity if the defect is located in the casing;
    performing, by the processor, an inversion algorithm on the first set of data and the second set of data, the inversion algorithm developed for a single tubing configuration; and
    displaying, using an output device, the location of the defect.

2. The method of claim 1, wherein aligning the second set of data with the first set of data comprises using collar responses as alignment markers.

3. The method of claim 1, wherein the first set of data comprises a first decay response, the second set of data comprises a second decay response, and adjusting the data comprises matching the first decay response with second decay response.

4. The method of claim 1, wherein the first set of data comprises a first decay response, wherein the second set of data comprises a second decay response, and wherein adjusting the data comprises matching a portion of the first decay response after a time threshold with a portion of the second decay response after the time threshold if the first of the non-nested tubings has a different outer diameter than the second of the non-nested tubings.

5. The method of claim 4, wherein identifying the location of the defect comprises comparing the first decay response with the second decay response before and after the time threshold.

6. A method of detecting defects in non-nested tubings or a casing comprising:
    conveying an electromagnetic tool through a first of the non-nested tubings to acquire a first set of data;
    conveying the electromagnetic tool through a second of the non-nested tubings to acquire a second set of data;
    calibrating, by a processor, the first set of data to reduce effects from the second of the non-nested tubings by aligning the second set of data with the first set of data;
    identifying, by the processor, a location of a defect in the first of the non-nested tubings, the second of the non-nested tubings, or the casing;
    adjusting, by the processor, the first set of data to compensate for eccentricity if the defect is located in the casing;
    performing, by the processor, an inversion algorithm on the first set of data and the second set of data, the inversion algorithm developed for a single tubing configuration; and
    displaying, using an output device, the location of the defect.

7. The method of claim 6, wherein the first set of data comprises a first decay response, the second set of data comprises a second decay response, and adjusting the data comprises matching the first decay response with second decay response.

8. The method of claim 7, wherein identifying the location of the defect comprises comparing the first decay response with the second decay response before and after a time threshold.

9. The method of claim 8, wherein the time threshold is determined based on outer diameters, thicknesses, and magnetic permeabilities of the non-nested tubings and the casing.

10. The method of claim 8, wherein the time threshold is determined based on historical data.

11. The method of claim 8, wherein the time threshold is determined based on simulating the non-nested tubings and casing without defects.

12. The method of claim 8, wherein identifying the location of the defect further comprises identifying that the defect is located on the first of the non-nested tubings based on a larger change in amplitude of the first decay response before the time threshold compared to a smaller change in amplitude of the second decay response after the time threshold.

13. The method of claim 8, wherein identifying the location of the defect further comprises identifying that the defect is located on the second of the non-nested tubings based on a smaller change in amplitude of the first decay response after the time threshold compared to a larger change in amplitude of the second decay response before the time threshold.

14. The method of claim 8 wherein identifying the location of the defect further comprises identifying that the defect is located on the casing based on a larger change in amplitude of the first decay response after the time threshold compared to a smaller change in amplitude of the first decay response before the time threshold as well as a larger change in amplitude of the second decay response after the time threshold compared to a smaller change in amplitude of the second decay response before the time threshold.

\* \* \* \* \*